(12) United States Patent  
Norris et al.

(10) Patent No.: US 7,810,402 B2
(45) Date of Patent: Oct. 12, 2010

(54) TORQUE MONITORING APPARATUS

(75) Inventors: Chris Norris, Indianapolis, IN (US); Stan Clemens, Westfield, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 70 days.

(21) Appl. No.: 12/260,120

(22) Filed: Oct. 29, 2008

(65) Prior Publication Data
US 2010/0101334 A1 Apr. 29, 2010

(51) Int. Cl.
*G01L 1/14* (2006.01)
(52) U.S. Cl. .................. 73/862.37; 73/862.08
(58) Field of Classification Search .. 73/862.08–862.37
See application file for complete search history.

(56) References Cited

U.S. PATENT DOCUMENTS

| | | | |
|---|---|---|---|
| 3,797,304 A * | 3/1974 | Klinger | 73/794 |
| 4,176,548 A * | 12/1979 | Cyphelly | 73/862.37 |
| 4,517,821 A * | 5/1985 | Taggart et al. | 73/1.11 |
| 4,809,557 A | 3/1989 | Maurer et al. | |
| 5,067,354 A | 11/1991 | Kawai | |
| 5,228,349 A | 7/1993 | Gee et al. | |
| 5,450,761 A | 9/1995 | Zilberman et al. | |
| 5,711,730 A * | 1/1998 | Friedman et al. | 474/18 |
| 5,969,269 A | 10/1999 | Munyon et al. | |
| 6,357,132 B1 * | 3/2002 | Banks | 33/700 |
| 6,439,067 B1 | 8/2002 | Goldman et al. | |
| 6,679,126 B2 | 1/2004 | Dalton et al. | |
| 6,782,766 B2 | 8/2004 | Parkinson | |
| 6,981,423 B1 | 1/2006 | Discenzo | |
| 7,093,504 B2 | 8/2006 | Southward | |
| 7,322,250 B1 | 1/2008 | Discenzo | |
| 7,392,714 B2 | 7/2008 | Maguire et al. | |
| 2010/0098528 A1 * | 4/2010 | Norris et al. | 415/118 |

* cited by examiner

*Primary Examiner*—Max Noori
(74) *Attorney, Agent, or Firm*—Ray Meiers; Meiers Law Office LLC

(57) ABSTRACT

A torque monitoring apparatus for monitoring torque between a driving structure rotating about a first axis and a driven structure rotating about a second axis. The torque monitoring apparatus includes a piston and cylinder assembly. The piston is received in an aperture defined by the cylinder. At least one of the piston and the cylinder is operable for connection to one of the driving structure and the driven structure and rectilinearly moveable along the first axis or the second axis. The aperture is centered on the axis of rectilinear movement.

17 Claims, 3 Drawing Sheets

TORQUE MONITORING APPARATUS

BACKGROUND OF THE INVENTION

1. Field of the Invention

The invention relates to an apparatus for monitoring torque between an input or driving structure and an output or driven structure and more particularly to an apparatus for monitoring torque in which a quantity of fluid is subjected to a variable force and the pressure of the fluid is correlated to a level of torque.

2. Description of Related Prior Art

A rotating shaft driving a load, such as another shaft, a gear train, or some other structure, is susceptible to torsional strain. Continuous strain on a loaded shaft may result in a loss of power transmission efficiency, or may result in shaft deformation, or in breakage of the shaft. Dynamic torque or strain fluctuations can exacerbate mechanical and fatigue damage. It is therefore desirable to apply some structure or device to measure the torque on the loaded shaft.

SUMMARY OF THE INVENTION

In summary, the invention is a torque monitoring apparatus for monitoring torque between a driving structure rotating about a first axis and a driven structure rotating about a second axis. The torque monitoring apparatus includes a piston and cylinder assembly. The piston is received in an aperture defined by the cylinder. At least one of the piston and the cylinder is operable for connection to one of the driving structure and the driven structure and rectilinearly moveable along the first axis or the second axis. The aperture is centered on the axis of rectilinear movement.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EXEMPLARY EMBODIMENTS

Figure 1:
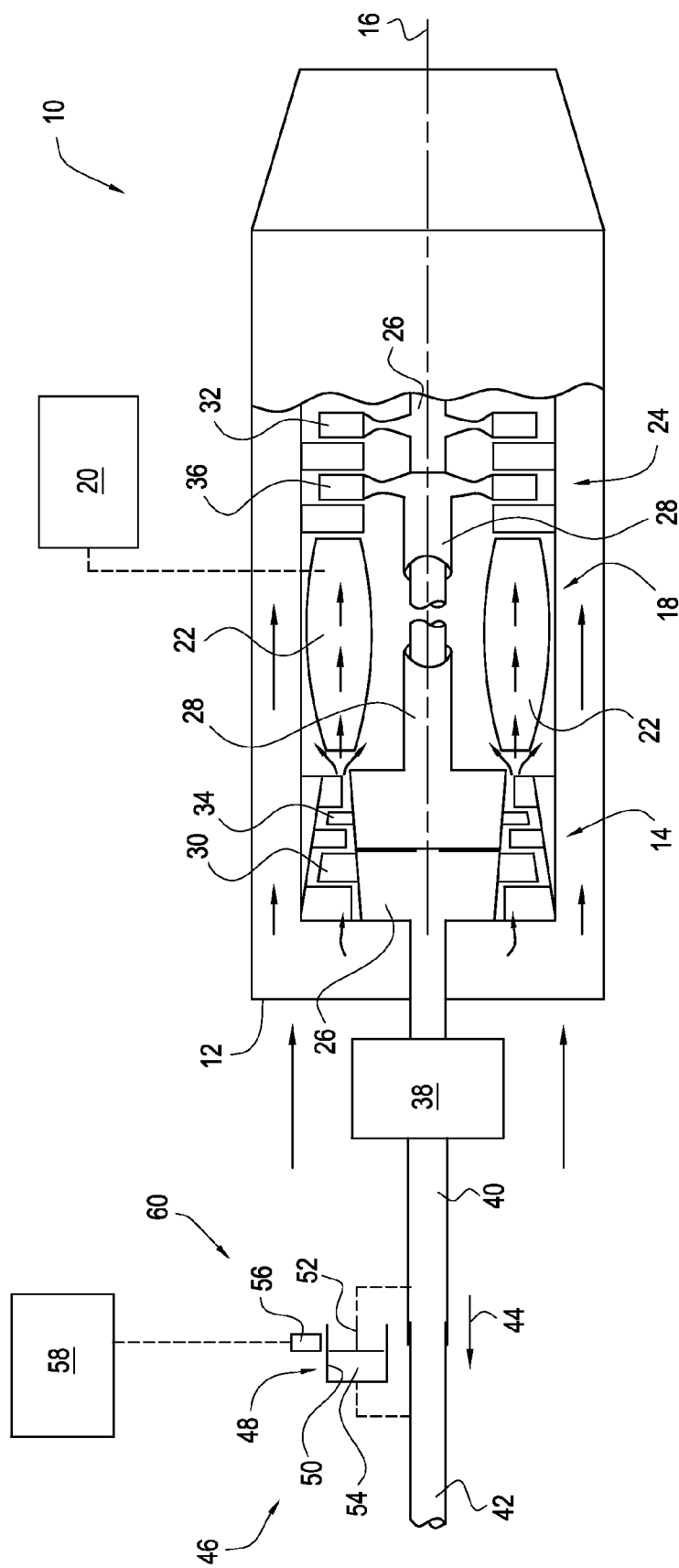
FIG. 1 is a schematic of a turbine engine which incorporates an exemplary embodiment of the invention.

A plurality of different embodiments of the invention is shown in the Figures of the application. Similar features are shown in the various embodiments of the invention. Similar features have been numbered with a common reference numeral and have been differentiated by an alphabetic suffix. Also, to enhance consistency, the structures in any particular drawing share the same alphabetic suffix even if a particular feature is shown in less than all of the embodiments. Similar features are structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

The exemplary embodiments of the present invention provide improved torque monitoring devices that are novel and non-obvious. The exemplary torque monitoring devices can be less complicated and costly than prior art torque monitoring devices. Alternative embodiments of the invention can be practiced to provide similar benefits in different operating environments. Benefits derived or perceived from the application of the exemplary embodiments of the invention are set forth below. However, it is noted that the benefits articulated herein may not be realized in all operating environments for all embodiments of the invention. Furthermore, it is noted that the benefits articulated herein are not exhaustive, other benefits may be perceived in the practice of the exemplary embodiment or in the practice of alternative embodiments of the invention. The benefits associated with the exemplary embodiments and described herein are not limitations of the broader invention, but rather demonstrate industrial applicability.

FIG. 1 schematically shows a turbine engine 10. The various unnumbered arrows represent the flow of fluid through the turbine engine 10. The turbine engine 10 can produce power for several different kinds of applications, including vehicle propulsion and power generation, among others. The exemplary embodiments of the invention disclosed herein, as well as other embodiments of the broader invention, can be practiced in any configuration of turbine engine and in applications other than turbine engines in which torque is transmitted.

The exemplary turbine engine 10 can include an inlet 12 to receive fluid such as air. The turbine engine 10 may include a fan to direct fluid into the inlet 12 in alternative embodiments of the invention. The turbine engine 10 can also include a compressor section 14 to receive the fluid from the inlet 12 and compress the fluid. The compressor section 14 can be spaced from the inlet 12 along a centerline axis 16 of the turbine engine 10. The turbine engine 10 can also include a combustor section 18 to receive the compressed fluid from the compressor section 14. The compressed fluid can be mixed with fuel from a fuel system 20 and ignited in an annular combustion chamber 22 defined by the combustor section 18. The turbine engine 10 can also include a turbine section 24 to receive the combustion gases from the combustor section 18. The energy associated with the combustion gases can be converted into kinetic energy (motion) in the turbine section 24.

In FIG. 1, shafts 26, 28 are shown disposed for rotation about the centerline axis 16 of the turbine engine 10. Alternative embodiments of the invention can include any number of shafts. The shafts 26, 28 can be journaled together for relative rotation. The shaft 26 can be a low pressure shaft supporting compressor blades 30 of a low pressure portion of the compressor section 14. The shaft 26 can also support low pressure turbine blades 32 of a low pressure portion of the turbine section 24.

The shaft 28 encircles the shaft 26. As set forth above, the shafts 26, 28 can be journaled together, wherein bearings are disposed between the shafts 26, 28 to permit relative rotation. The shaft 28 can be a high pressure shaft supporting compressor blades 34 of a high pressure portion of the compressor section 14. The shaft 28 can also support high pressure turbine blades 36 of a high pressure portion of the turbine section 24.

The low pressure shaft 26 can drive other structures, such as a gear train, a fan, a propeller shaft, a rotor, a tower shaft or any other shaft, or any other structure. In the schematic view of FIG. 1, the low pressure shaft 26 can be coupled to a reduction gear box 38 and a first intermediate shaft 40. The reduction gear box 38 can be coupled directly with the low pressure shaft 26 and can transmit rotation from the low pressure shaft 26 to the intermediate shaft 40 at a reduced angular velocity.

The first intermediate shaft 40 can be coupled to a second intermediate shaft 42. The shafts 40, 42 can be coupled together through straight or helical splines. The shafts 40, 42 can be coupled together such that a load is transmitted along the axis 16, represented by an arrow 44. The axial load corresponds to the amount of torque being transmitted between the shafts 40, 42 and may or may not act on both shafts 40, 42. The axial load can be generated at the intersection of the shafts 40, 42, by coupling the shafts 40, 42 through helical splines. Alternatively, the load can be generated at an end of the shaft 40 opposite the shaft 42, or at an end of the shaft 42 opposite the shaft 40. The axial load represented by the arrow 44 results in rectilinear movement of one of the shafts 40, 42. The extent of rectilinear movement can be relatively small. The arrow 44 is pointed toward the shaft 42 for illustrative purposes; the axial load could be directed in either direction along the axis 16 in various embodiments of the invention.

A torque monitoring apparatus 46 can be positioned to sense the torque being transmitted from the first intermediate shaft 40 to the second intermediate shaft 42. The torque monitoring apparatus 46 can include a piston and cylinder assembly 60 with a cylinder 48 defining an aperture 50 and a piston 52 received in the aperture 50. The axial load represented by the arrow 44 can act on and urge the piston 52 or the base of the cylinder 48 closer to the other to increase the fluid pressure. For example, the axial load represented by the arrow 44 can result in rectilinear movement of the piston 52 along the axis 16, toward the cylinder 48. Incompressible fluid such as oil can be disposed in a cavity 54 defined by the aperture 50 and the piston 52. The pressure of the fluid can increase or decrease in response to increases or decreases in the axial load represented by the arrow 44. The axial load represented by the arrow 44 can correspond to the torque load between the shafts 40, 42. As a result, the pressure acting on the fluid in the cavity 54 can correspond to the torque load between the shafts 40, 42.

The extent of fluid pressure in the cavity 54 can be monitored and correlated to a level of torque. For example, a sensor 56 can be positioned to communicate with the cavity 54 and sense fluid pressure. The sensor 56 can communicate the sensed pressure to a controller 58 in the form of signals. The controller 58 can receive signals from the sensor 56 and apply programmable logic to convert the signal into a level of torque.

Figure 2:
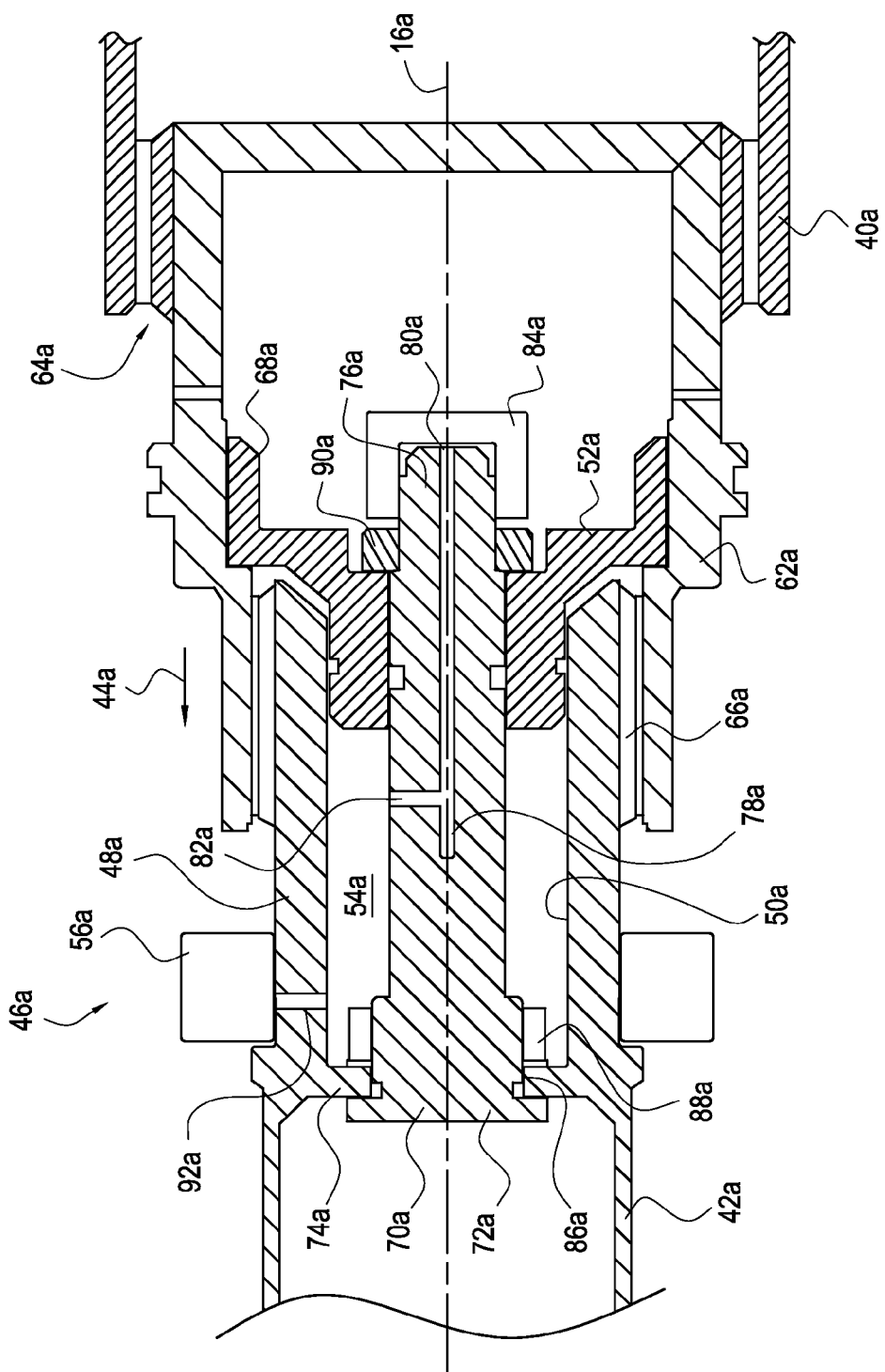
FIG. 2 is a cross-sectional view of a second exemplary embodiment of the invention.

FIG. 2 shows a second exemplary embodiment of the invention. An output shaft 42a can be driven in rotation by an input shaft 40a through a coupling member 62a. The coupling member 62a and the input shaft 40a can be connected to one another through helical splines 64a. The input and output shafts 40a, 42a can rotate about a common axis 16a. However, in alternative embodiments of the invention, the input and output shafts 40a, 42a can rotate about different axes.

The coupling member 62a and the output shaft 42a can be coupled through helical splines 66a. The exemplary helical splines 66a can have a helix angle of approximately 7.5 degrees; however, other helix angles can be applied in alternative embodiments of the invention. Because of the connection through helical splines 66a, an axial force or load represented by the arrow 44a can arise and urge the coupling member 62a toward the output shaft 42a. The force represented by the arrow 44a can act along the axis of rotation of both of the input and output shafts 40a, 42a. However, in alternative embodiments of the invention, the axial force could act along only the axis of rotation of the input shaft 40a or along only the axis of rotation of the output shaft 42a.

A torque monitoring apparatus 46a can be positioned within the rotating structures and can include a piston 52a received in an aperture 50a defined by a cylinder 48a. The cylinder 48a can be integral with or defined by the output shaft 42a. The piston 52a can be engaged with coupling member 62a through threads 68a. It is noted that the coupling member 62a could be omitted in alternative embodiments of the invention, wherein the piston 52a could be integral with the input shaft 40a or threadingly engaged with the input shaft 40a. It also noted that the piston 52a could be associated with the output shaft 42a and the cylinder 48a could be associated with the input shaft 40a in alternative embodiments of the invention.

As shown in FIG. 2, a cavity 54a can be at least partially defined by the driving structure (the input shaft 40a) or the driven structure (the output shaft 42a). The cavity 54a contains a quantity of fluid and can be centered on the axis 16a. Centering the cavity on the axis 16a prevents a bending moment from arising. The aperture 50a can therefore also be centered on the axis 16a. The exemplary torque monitoring apparatus 46a can also include a bolt 70a extending between a head or base 72a fixed to a bottom 74a of the cylinder 48a and a distal end 76a. A passageway 78a can extend at least partially through the bolt 70a between a first opening 80a at the distal end 76a and a second opening 82a communicating with the cavity 54a. The exemplary torque monitoring apparatus 46a can also include a cap 84a releasably fixed to the distal end 76a in order to close the passageway 78a.

During assembly of the second exemplary embodiment, the bolt 70a can be inserted through an aperture 86a defined in the bottom 74a and held in place with a lock nut 88a. The piston 52a can include a ring-like portion that encircles the bolt 70a. The piston 52a can be received on the bolt 70a and a second lock nut 90a can be positioned on the distal end 76a to prevent the piston 52a from separating from the bolt 70a. Fluid can then be injected into the cavity 54a through the passageway 78a. When the desired amount of fluid is dispensed into the cavity 54a, the cap 84a can be assembled to the distal end 76a to thereby close the passageway 78a. As a result, the cavity 54a is substantially sealed. The quantity of the fluid in the cavity 54a can therefore be static; as shown in the drawing, the embodiment can be without a fluid circuit directing fluid to the cavity 54a and allowing fluid to escape the cavity 54a.

In operation, the input shaft 40a can rotate and transmit rotation to the output shaft 42a along a path of torque transfer including the coupling member 62a. The helical splines 66a between the coupling member 62a and the output shaft 42a can result in a force represented by the arrow 44a, urging the coupling member 62a in the direction of the arrow 44a. The piston 52a can be fixed to the coupling member 62a and therefore also be urged in rectilinear movement the direction of arrow 44a along the axis 16a, sliding along the bolt 70a. It is noted that in the second exemplary embodiment, the piston 52a can both move along the axis 16a of rotation and also rotate about the axis 16a. The greater the torque being transmitted between the input and output shafts 40a, 42a, the greater the axial force. The greater the axial force, the greater the pressure of the fluid in the cavity 54a. A sensor 56a can sense the pressure in the cavity through a port 92a.

Figure 3:
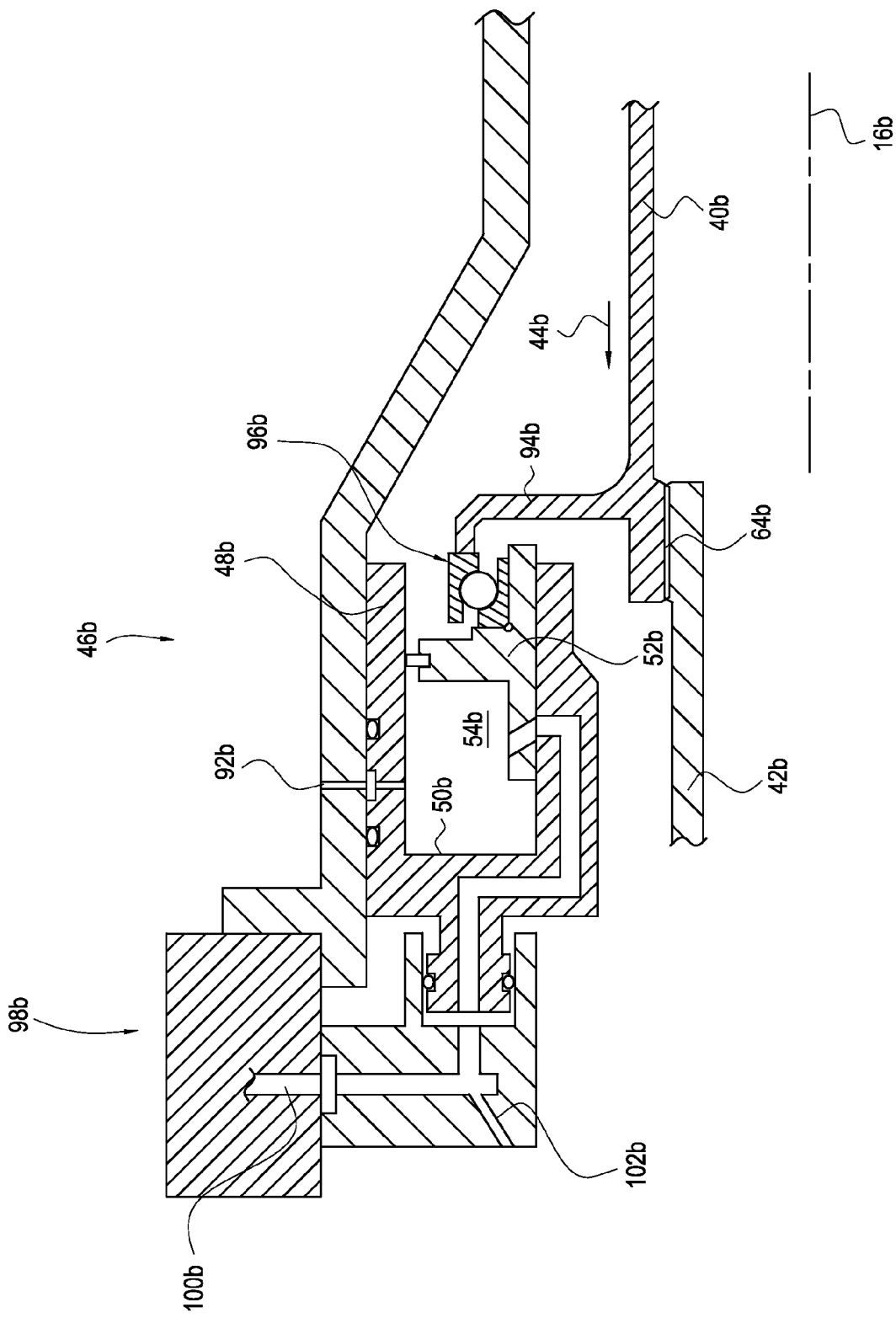
FIG. 3 is a cross-sectional view of a third exemplary embodiment of the invention.

FIG. 3 shows a third exemplary embodiment of the invention. An output shaft 42b can be driven in rotation by an input shaft 40b through straight splines 64b. An axial load represented by the arrow 44b can be applied to the input shaft 40b remotely from the output shaft 42b. A flange portion 94b can extend radially outward from the input shaft 40b to urge a piston 52b in the direction of the arrow 44b. A thrust bearing 96b can be positioned between the flange portion 94b and the piston 52b; the piston 52b can thus be disposed for rectilinear movement along the axis 16b and not rotation about the axis 16b.

A torque monitoring apparatus 46b can be positioned outside of the rotating structures and include the piston 52b received in an aperture 50b defined by a cylinder 48b. The torque monitoring apparatus 46b can be outside the path of torque transfer between the first and second structures 40b, 42b. The term "cylinder" is used in the application since the term is commonly applied to a structure that receives a piston in hydraulic arrangements. As demonstrated by FIG. 3, a cylinder and the aperture defined by the cylinder need be any particular shape in embodiments of the invention. The aperture 50b can be ring-like and continuous around the axis 16b. As demonstrated by FIG. 2, the aperture 50a can be circular and continuous. In FIG. 1, the aperture 50 can be a discontinuous group of circular apertures. One aperture 50 of the group is shown since FIG. 1 is schematic, but a plurality of apertures similar to aperture 50 can be positioned about the axis 16 wherein each aperture receives an individual piston. The cumulative aperture would thus be centered on the axis of rectilinear movement.

Referring again to FIG. 3, the aperture 50b is spaced from and centered on the axis 16b of rotation. The piston 52b can be ring-like and a cavity 54a containing a quantity of fluid can be defined between the aperture 50b and the piston 52b. The cavity 54b can be positioned remote from the axis 16b. A fluid circulation system 98b can be operable to deliver fluid to the cavity 54b. The fluid circulation system 98b can thus be outside of a path of torque transfer between the first and second structures 40b, 42b. Fluid can pass through a passageway 100b to reach the cavity 54b. Some fluid can be diverted for lubricating other structures, such as diverted through a nozzle 102b. The pressure in the cavity 54b can be sensed by a sensor (not shown) through a port 92b.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A torque monitoring apparatus for monitoring torque between a driving structure rotating about a first axis and a driven structure rotating about a second axis, wherein said torque monitoring apparatus comprises:
   a piston and cylinder assembly wherein said piston is received in an aperture defined by said cylinder and wherein at least one of said piston and said cylinder is operable for connection to one of the driving structure and the driven structure and rectilinearly moveable along one of the first and second axes, and wherein said aperture is centered on said one of the first and second axes, and wherein a substantially sealed cavity is defined between said aperture and said piston such that a quantity of fluid in the cavity is static.

2. The torque monitoring apparatus of claim 1 wherein said aperture is spaced from said one of the first and second axes.

3. The torque monitoring apparatus of claim 1 wherein said piston is ring-shaped and encircles said one of the first and second axes.

4. A torque monitoring apparatus for monitoring torque between a driving structure rotating about a first axis and a driven structure rotating about a second axis, wherein said torque monitoring apparatus comprises:
   a piston and cylinder assembly wherein said piston is received in an aperture defined by said cylinder and wherein at least one of said piston and said cylinder is operable for connection to one of the driving structure and the driven structure and rectilinearly moveable along one of the first and second axes, and wherein said aperture is centered on said one of the first and second axes, wherein said piston is both rectilinearly movable along and rotatable about said one of the first and second axes.

5. A method comprising the steps of:
   transmitting torque to a driven structure with a driving structure rotating about a first axis;
   urging at least one of the driving structure and the driven structure in a rectilinear direction along a second axis during said transmitting step, including coupling the driving structure and the driven structure through helical splines to generate forces urging at least one of the driving structure and the driven structure in the rectilinear direction along the second axis during said transmitting step;
   positioning the at least one of the driving structure and the driven structure to act on a quantity of fluid disposed in a cavity during said urging step; and
   centering the cavity containing the quantity of fluid on the second axis.

6. The method of claim 5 wherein said urging step is further defined as:
   urging the driving structure toward the driven structure along the second axis during said transmitting step.

7. The method of claim 5 wherein said positioning step is further defined as:
   engaging a piston positionable in the cavity with the at least one of the driving structure and the driven structure through mating threads.

8. A method of claim 5 said positioning step is further defined as:
   defining the cavity with the at least one of the driving structure and the driven structure.

9. The method of claim 5 further comprising the step of:
   sealing the cavity containing the quantity of fluid to define a static quantity of fluid.

10. The method of claim 5 further comprising the step of:
    positioning the cavity remote from the second axis.

11. A turbine engine comprising:
    a first structure rotatable about a first axis;
    a second structure driven in rotation about a second axis by said first structure;
    a torque monitoring apparatus for monitoring torque between said first and second structures, wherein said torque monitoring apparatus includes:
       a cylinder defining an aperture;
       a piston received in said aperture wherein at least one of said piston and said cylinder is operable for connection to one of the first and second structures and thereby rectilinearly moveable along one of the first and second axes, and wherein said aperture is centered on said one of said first and second axes; and
       a fluid circulation system operable to deliver fluid to a cavity defined between said aperture and said piston, wherein said fluid circulation system is outside of a path of torque transfer between said first and second structures.

12. The turbine engine of claim 11 wherein the torque monitoring apparatus is outside the path of torque transfer between said first and second structures.

13. The turbine engine of claim 11 wherein said first and second structures are directly coupled together with straight splines.

14. A turbine engine comprising:
    a first structure rotatable about a first axis;
    a second structure driven in rotation about a second axis by said first structure;
    a torque monitoring apparatus for monitoring torque between said first and second structures, wherein said torque monitoring apparatus includes:
    a cylinder defining an aperture;
    a piston received in said aperture wherein at least one of said piston and said cylinder is operable for connection to one of the first and second structures and thereby rectilinearly moveable along one of the first and second axes, and wherein said aperture is centered on said one of said first and second axes;
    a bolt extending from a base fixed to a bottom of said cylinder to a distal end, wherein a passageway extends at least partially through said bolt between a first opening at said distal end and a second opening communicating with a cavity defined between said aperture and said piston; and
    a cap releasibly fixed to said distal end to close said passageway, wherein said piston encircles and is slidably moveable along said bolt.

15. The turbine engine of claim 14 wherein said cylinder is defined by one of said first and second structures.

16. The turbine engine of claim 15 wherein said piston is threadingly engaged with the other of said first and second structures.

17. The turbine engine of claim 14 wherein said first and second axes are collinear.

\* \* \* \* \*